United States Patent
Sakthivel et al.

(10) Patent No.: US 11,989,890 B2
(45) Date of Patent: May 21, 2024

(54) METHOD AND SYSTEM FOR GENERATING AND LABELLING REFERENCE IMAGES

(71) Applicant: HCL Technologies Limited, New Delhi (IN)

(72) Inventors: Siva Sakthivel, Chennai (IN); Naveen Subramanian, Chennai (IN); Yuvarajan Shanmugasundaram, Chennai (IN); Sankareswari Amudhasidhanandham, Chennai (IN); Akhilesh Chandra Singh, Noida (IN)

(73) Assignee: HCL Technologies Limited, New Delhi (IN)

( * ) Notice: Subject to any disclaimer, the term of this patent is extended or adjusted under 35 U.S.C. 154(b) by 289 days.

(21) Appl. No.: 17/178,644

(22) Filed: Feb. 18, 2021

(65) Prior Publication Data

US 2021/0303924 A1     Sep. 30, 2021

(51) Int. Cl.
    *G06T 7/246*     (2017.01)
    *G06F 16/81*     (2019.01)
    (Continued)

(52) U.S. Cl.
    CPC .............. *G06T 7/246* (2017.01); *G06F 16/81* (2019.01); *G06F 18/214* (2023.01);
    (Continued)

(58) Field of Classification Search
    CPC ... G06T 7/246; G06T 7/11; G06T 7/20; G06T 11/00; G06T 2207/20081;
    (Continued)

(56) References Cited

U.S. PATENT DOCUMENTS

| 7,209,149 B2 | 4/2007 | Jogo |
| 8,218,830 B2 | 7/2012 | Gavin et al. |

(Continued)

FOREIGN PATENT DOCUMENTS

| CN | 109946746 A | * | 6/2019 |
| EP | 1320043 A2 | | 6/2003 |
| KR | 101443404 B1 | | 10/2014 |

OTHER PUBLICATIONS

Automated Annotation with V7 Darwin, "https://www.v7labs.com/automated-annotation".

(Continued)

*Primary Examiner* — Edward F Urban
*Assistant Examiner* — Wassim Mahrouka (57) ABSTRACT

The invention relates to method and system for automatically generating and labelling reference images. In some embodiments, the method includes tracking a plurality of highlighted objects in a set of input images along with audio data associated with the plurality of highlighted objects. The method further includes cropping each of the plurality of highlighted objects from each of the set of images based on tracking, contemporaneously capturing an audio clip associated with each of the plurality of highlighted objects from the audio data based on tracking, and labelling each of the plurality of highlighted objects based on text data generated from the audio clip associated with each of the plurality of objects to generate a labelled reference image.

17 Claims, 4 Drawing Sheets

(51) Int. Cl.
   *G06F 18/214*   (2023.01)
   *G06F 40/143*   (2020.01)
   *G06F 40/279*   (2020.01)
   *G06N 3/08*     (2023.01)
   *G06T 7/11*     (2017.01)
   *G06T 7/20*     (2017.01)
   *G06T 11/00*    (2006.01)
   *G06V 10/25*    (2022.01)
   *G06V 10/774*   (2022.01)
   *G10L 15/26*    (2006.01)
   *G10L 25/51*    (2013.01)

(52) U.S. Cl.
   CPC .......... *G06F 40/143* (2020.01); *G06F 40/279* (2020.01); *G06N 3/08* (2013.01); *G06T 7/11* (2017.01); *G06T 7/20* (2013.01); *G06T 11/00* (2013.01); *G06V 10/25* (2022.01); *G06V 10/7753* (2022.01); *G10L 15/26* (2013.01); *G10L 25/51* (2013.01); *G06T 2207/20081* (2013.01); *G06T 2207/20132* (2013.01); *G06T 2210/12* (2013.01)

(58) Field of Classification Search
   CPC ....... G06T 2207/20132; G06T 2210/12; G06T 2200/24; G06T 11/60; G06T 2207/20084; G06T 2207/30241; G06T 7/194; G06F 16/81; G06F 18/214; G06F 40/143; G06F 40/279; G06F 16/7837; G06F 16/7844; G06N 3/08; G06V 10/25; G06V 10/7753; G10L 15/26; G10L 25/51
   See application file for complete search history.

(56) References Cited

U.S. PATENT DOCUMENTS

| | | | |
|---|---|---|---|
| 8,422,832 B2 | 4/2013 | Makadia et al. | |
| 8,660,351 B2 | 2/2014 | Tang | |
| 8,768,693 B2 | 7/2014 | Somekh et al. | |
| 9,256,807 B1* | 2/2016 | Shlens | G06F 16/739 |
| 2014/0082465 A1* | 3/2014 | Jee | G06F 40/166 |
| | | | 715/202 |
| 2016/0267921 A1* | 9/2016 | Dang | G06F 16/433 |
| 2018/0196742 A1* | 7/2018 | Yuan | G06F 11/3672 |
| 2019/0347501 A1* | 11/2019 | Kim | G06F 3/011 |
| 2020/0012888 A1* | 1/2020 | Lian | G06V 20/10 |

OTHER PUBLICATIONS

Nadav Soferman, "Introducing smart cropping, intelligent quality selection and automated responsive images".

* cited by examiner

METHOD AND SYSTEM FOR GENERATING AND LABELLING REFERENCE IMAGES

FIELD OF INVENTION

Generally, the invention relates to image processing. More specifically, the invention relates to method and system for automatically generating and labelling reference images.

BACKGROUND OF INVENTION

Typically, Artificial Intelligence (AI) models such as Artificial Neural Networks (ANN) based models require extensive training so as to perform effective classification or prediction. Such training required a huge annotated training dataset. As will be appreciated, the more and diverse the training dataset, the better and accurate is the outcome. In other words, an ANN model trained with a huge and diverse dataset may predict better as compared to an ANN model trained with limited dataset. However, generating such huge and diverse training dataset is challenging because of manual or semi-manual labelling required.

In particular, for AI models developed for image related applications (e.g., object recognition, image comparison, etc.), generating training data by manually cropping and labelling a huge number of images is cumbersome, time consuming, and error prone. For example, inaccuracies while manually cropping and labeling reference images may result in incorrect identification of objects in subsequent images. Additionally, there may be manual errors while making boundary boxes to objects or while labeling same objects. Further, when a large number of objects are involved, time required for cropping and labeling each object in a large number of images as well as errors may get amplified.

Therefore, it is desirable to provide method and system that automatically generate and label reference images with high precision.

SUMMARY OF INVENTION

In one embodiment, a method of generating and labelling reference images is disclosed. The method may include tracking a plurality of highlighted objects in a set of input images along with audio data associated with the plurality of highlighted objects. The method may further include cropping each of the plurality of highlighted objects from each of the set of images based on tracking. The method may further include contemporaneously capturing an audio clip associated with each of the plurality of highlighted objects from the audio data based on tracking. The method may further include labelling each of the plurality of highlighted objects based on a text data generated from the audio clip associated with each of the plurality of objects to generate a labelled reference image.

In another embodiment, a system for generating and labelling reference images is disclosed. The system may include a processor and a memory communicatively coupled to the processor. The memory may store processor-executable instructions, which, on execution, may causes the processor to track a plurality of highlighted objects in a set of input images along with audio data associated with the plurality of highlighted objects. The processor-executable instructions, on execution, may further cause the processor to crop each of the plurality of highlighted objects from each of the set of images based on tracking. The processor-executable instructions, on execution, may further cause the processor to contemporaneously capture an audio clip associated with each of the plurality of highlighted objects from the audio data based on tracking. The processor-executable instructions, on execution, may further cause the processor to label each of the plurality of highlighted objects based on a text data generated from the audio clip associated with each of the plurality of objects to generate a labelled reference image.

In yet another embodiment, a non-transitory computer-readable medium storing computer-executable instruction for generating and labelling reference images is disclosed. The stored instructions, when executed by a processor, may cause the processor to perform operations including tracking a plurality of highlighted objects in a set of input images along with audio data associated with the plurality of highlighted objects. The operations may further include cropping each of the plurality of highlighted objects from each of the set of images based on tracking. The operations may further include contemporaneously capturing an audio clip associated with each of the plurality of highlighted objects from the audio data based on tracking. The operations may further include labelling each of the plurality of highlighted objects based on a text data generated from the audio clip associated with each of the plurality of objects to generate a labelled reference image.

BRIEF DESCRIPTION OF THE DRAWINGS

The present application can be best understood by reference to the following description taken in conjunction with the accompanying drawing figures, in which like parts may be referred to by like numerals

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
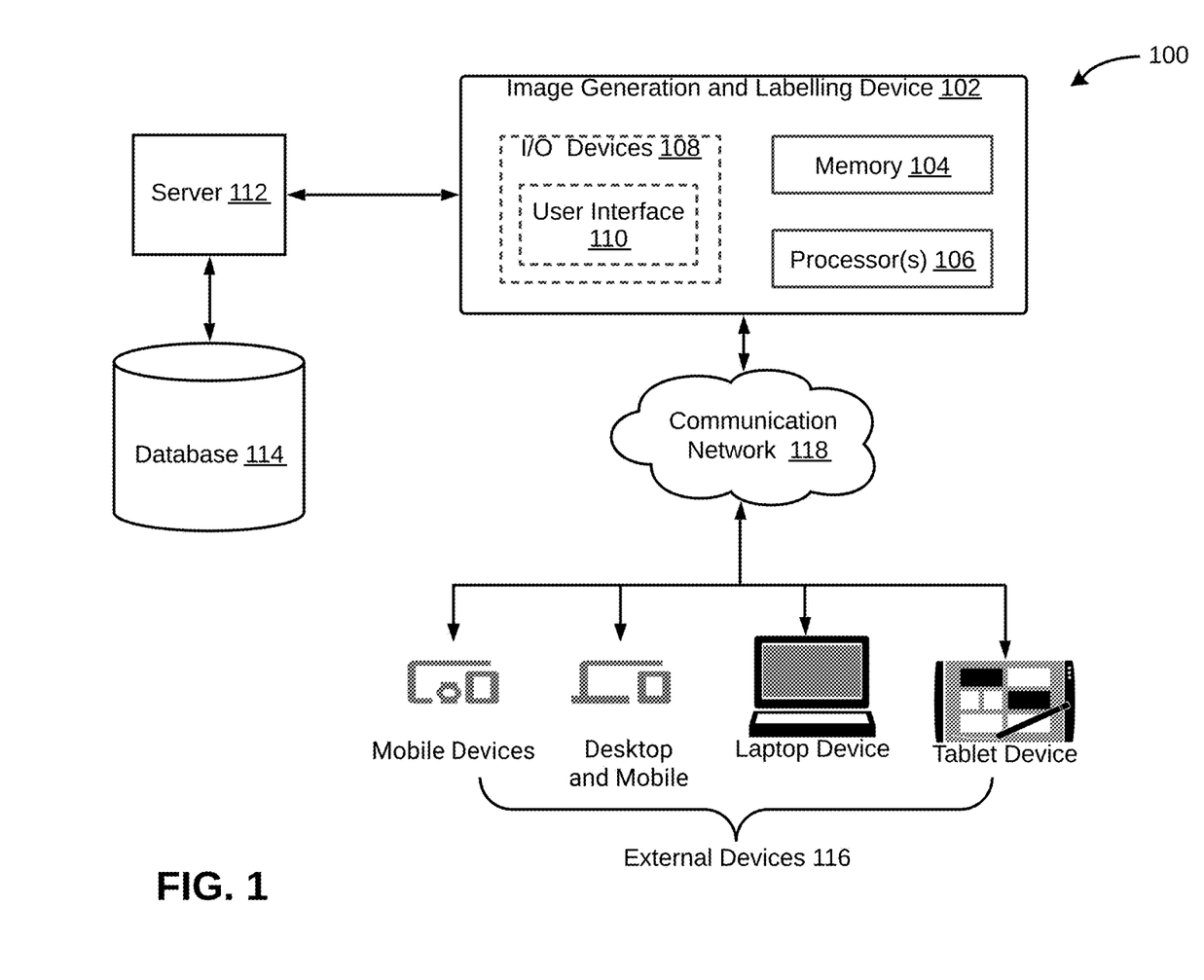
FIG. 1 is a block diagram of an exemplary system for generating and labelling reference images, in accordance with some embodiments of the present disclosure.

Referring now to FIG. 1, a block diagram of an exemplary system 100 for generating and labelling reference images is illustrated, in accordance with some embodiments of the present disclosure. The system 100 may include an image generation and labelling device 102 that generates and labels the reference images. In particular, the image generation and labelling device 102 automatically extracting objects of interest from input images as reference images. The image generation and labelling device 102 may then automatically tag the reference images with correct labels for the corresponding objects. The labelled reference images may be utilized as training dataset for AI models. Additionally, the labelled reference images may be used in other applications including, but not limited to, test automation. Thus, the system 100 may resolve aforementioned problems by automatically generating and labeling the reference images with high accuracy.

Examples of the image generation and labelling device 102 may include, but are not limited to, a server, a desktop, a laptop, a notebook, a tablet, a smartphone, a mobile phone, an application server, or the like. The image generation and labelling device 102 may include a memory 104, one or more processors 106, and and input/output devices 108. The memory 104 may store instructions that, when executed by the processors 106, cause the processors 106 to generate and label the reference images from the input images and the associated audio data, in accordance with some embodiments of the present invention. As will be described in greater detail in conjunction with FIG. 2 to FIG. 4, in order to generate and label the reference images, the processor 106 in conjunction with the memory 104 may perform various functions including tracking objects, tracking associated audio data, cropping objects, capturing audio data associated with object, clipping to text conversion and labelling for the reference images.

The memory 104 may also store various data (e.g. input images, associated audio data, extracted objects, associated audio clips, associated texts, labels, labelled reference images, narrator tool, XML files, etc.) that may be captured, processed, and/or required by the image reconstruction device 101. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

The image reconstruction device 101 may interact with a user or an administrator via the input/output devices 104. In particular, the image reconstruction device 101 may interact with the user/administrator via a user interface (not shown) accessible via the display device (not shown). Thus, for example, in some embodiments, the image generation and labelling device 102 may ingest input images provided by the user/administrator via the user interface. Further, for example, in some embodiments, the image generation and labelling device 102 may render results (e.g., labelled reference images) to the user/administrator via the user interface. In some embodiments, the user/administrator may provide inputs to the image generation and labelling device 102 via the user interface.

Further, the image generation and labelling device 102 may interact with a server 112 for sending/receiving various data. For example, in some embodiments, the image generation and labelling device 102 may receive input images from the server 112 or send the labelled reference images to the server 112. The server 112 is further communicatively coupled to a database 114, which may store the input images or the labelled reference images. Moreover, the image reconstruction device 101 may interact with one or more external devices 116 over a communication network 118 for sending and receiving various data (e.g., input images, labelled reference images, etc.). The one or more external devices 116 may include, but may not be limited to, a desktop, a laptop, a notebook, a netbook, a tablet, a smartphone, a remote server, a mobile phone, or another computing system/device. For example, the image generation and labelling device 102 may share the generated labelled reference images with for training AI model implemented over one of these external devices 116. The communication network 118 may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

Figure 2:
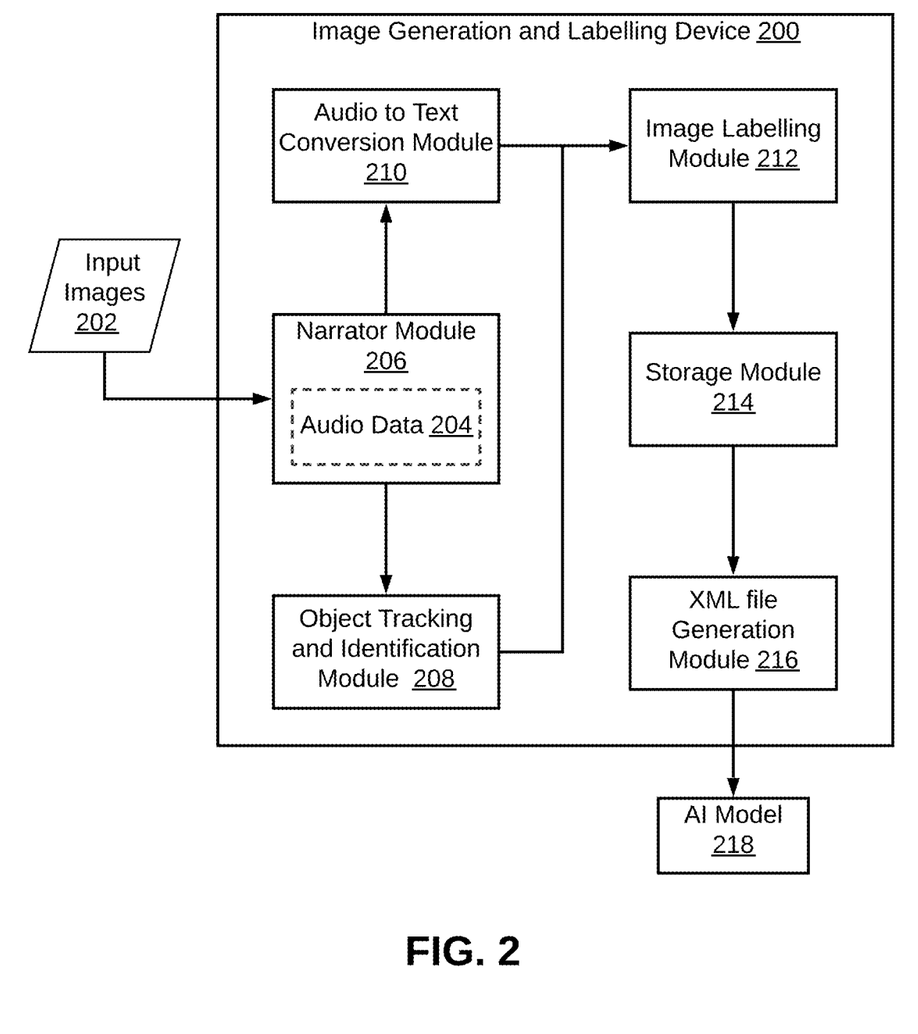
FIG. 2 is a functional block diagram of an exemplary image generation and labelling device, in accordance with some embodiments of the present disclosure.

Referring now to FIG. 2, a block diagram of an exemplary image generation and labelling device 200 (analogous to the image generation and labelling device 102 implemented by system 100 of FIG. 1) is illustrated, in accordance with some embodiments of the present disclosure. In some embodiments, the image generation and labelling device 102 may run an automation script that comprise logics to perform various functions so as to automate the process of image generation and labeling. In particular, the image generation and labelling device 102 may organize these functions under various modules including, but not limited to, a narrator module 206, an object tracking and identification module 208, an audio to text conversion module 210, an image labelling module 212, a storage module 214, an Extensible Markup Language (XML) file generation module 216. A set of input images 202 may be used as an input to the image generation and labelling device 102. Further, the labelled reference images may be provided as output to various applications including, but not limited to, an AI model 218.

The set of input images 202 may correspond to a web page or an application window. Additionally, each of the set of input images 202 may comprise a plurality of objects that may be extracted to generate reference images. Further, labelled referenced images may be generated by using the set of input images in order to automate at least one of application testing and device testing. Further, the set of input images 202 may be transmitted to the narrator module 206 for further processing.

The narrator module 206 may receive the set of input images 202. The narrator module 206 may implement a narrator tool (also referred to as accessibility tool) that highlights a plurality of objects in the set of input images 202 and narrates description of the plurality of objects. The narrator tool is further configured to track the plurality of highlighted objects and audio data 204 associated with the plurality of highlighted objects as the narration happens, in accordance with some embodiments of the present invention. Thus, an audio clip associated with each of the plurality of highlighted objects may be captured from the associated audio data 204 based on tracking.

The narrator module 206 may perform tracking of the highlighted objects and audio data and capturing of the audio clip associated with each highlighted object, while traversing from one highlighted object to another. In other words, when a user navigates from one object of an input image to another object then a series of objects may get highlighted and a section of the audio data may be recorded for each of the plurality of highlighted objects as audio clip. Further, the audio clip may be associated with a highlighted object and this may be performed for each of the plurality of highlighted objects. In some embodiments, the audio clip associated with each of the plurality of highlighted objects may be captured based on tracking, by the narrator module 206. Further, the narrator module 206 may be communicatively interconnected between the object tracking and identification module 208 and the audio to text conversion module 210. The highlighted objects may be transmitted to the connected object tracking and identification module 208 and associated audio data including captured audio clip associated with each of the plurality of highlighted objects may be transmitted to the audio to text conversion module 210.

The object tracking and identification module 208 receives the plurality of highlighted objects from the narrator module 206. The object tracking and identification module 208 may be configured to identify the plurality of highlighted objects. In an embodiment, the object tracking and identification module 208 may crop each of the plurality of highlighted objects from each of the set of input images. The object tracking and identification module 208 may crop the plurality of highlighted objects based on tracking. It should be noted that the object tracking and identification module 208 crops each of the plurality of highlighted objects enclosed with a bounding box. An image processing technique may be used to crop the plurality of highlighted objects. Also, a pixel to pixel comparison may be performed to identify a particular portion to be cropped. Further, the cropped plurality of highlighted objects may be transmitted to the coupled image labelling module 212.

On the other side, the audio to text conversion module 210 may be configured to receive the audio data comprising audio clips associated with each of the plurality of highlighted objects. The audio to text conversion module 210 may convert the audio clip associated with each of the plurality of highlighted objects into a text data. It should be noted that the text data may comprise a plurality of labels. The audio to text conversion module 210 may be operatively coupled to the image labelling module 212. The text data generated from the audio clip associated with each of the plurality of highlighted objects may be transmitted to the coupled image labelling module 212.

The image labelling module 212 may be configured to generate labeled reference images. The image labelling module 212 receives the cropped objects and the text data. Further, the image labelling module 212 extracts a plurality of keywords (labels) from the text data. It may be noted that each object may be labelled with one or more appropriate keywords from the plurality of keywords in order to generate labelled reference images. Further, the image labelling module 212 may be communicatively coupled to the storage module 214.

The storage module 214 may receive the labelled reference images from the image labelling module 212. The storage module 214 keeps the labelled reference images. Further, the storage module 214 may be configured to receive, store, and manage the plurality of reference images. Also, the storage module 214 may store the script required to execute generation and labelling of the reference images. The script may comprise logics of cropping, generating and labelling reference images. Further, the storage module 214 may store intermediate results generated by the various modules of the image generation and labeling device 102. The storage module 214 is connected to the image labelling module 212 and the XML file generation module 216 via input and output terminals.

The XML file generation module 216 may fetch the labelled reference images from the storage module 214. Further, the XML file generation module 216 may generate XML files using the labelled reference images. The XML file may correspond to an object. It should be noted that each XML file may include a label of the object, a reference coordinate of the object (say, 'X' and 'Y' coordinates), a height of the object, and a width of the object. Further, the generated XML files may be fed to the AI model 218 as training dataset. The AI model 218 use these XML files for learning and sometimes for testing.

It should be noted that the image generation and labelling device 102 may be implemented in programmable hardware devices such as programmable gate arrays, programmable array logic, programmable logic devices, or the like. Alternatively, the image generation and labelling device 102 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for generating and labelling reference images. For example, the exemplary system 100 and associated image generation and labelling device 102 may generate and label the reference images, by the process discussed herein. In particular, as will be appreciated by those of ordinary skill in the art, control logic and/or automated routines for performing the techniques and steps described herein may be implemented by the system 100 and the associated image generation and labelling device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 3:
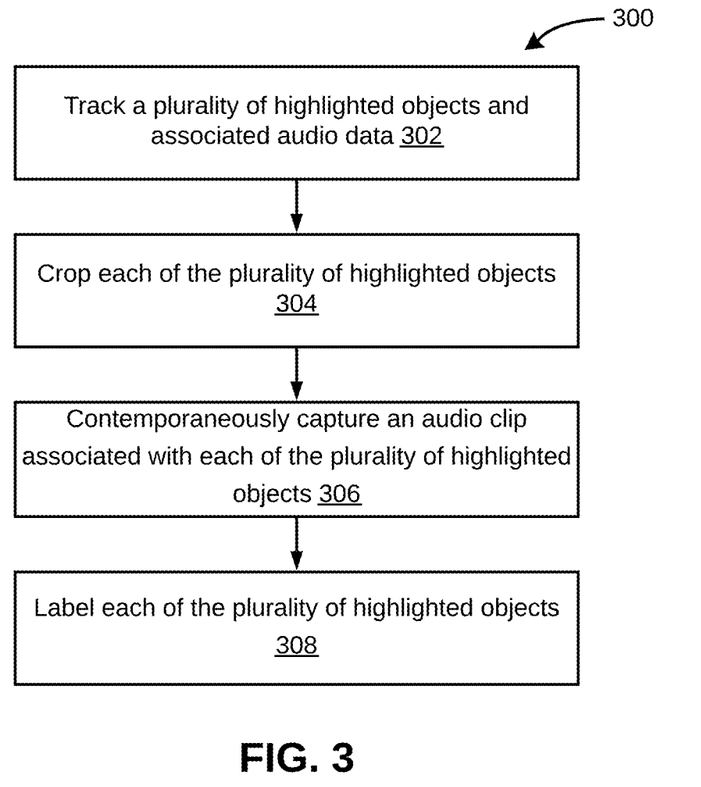
FIG. 3 is a flow diagram of an exemplary process for generating and labelling reference images, in accordance with some embodiments of the present disclosure.

Referring now to FIG. 3, an exemplary process 300 for generating and labelling reference images is depicted via a flowchart, in accordance with some embodiments of the present disclosure. Each of the steps of process 300 may be performed by the image generation and labelling device 102. At step 302, a plurality of highlighted objects may be tracked. The tracking of the plurality of highlighted objects may be performed in a set of input images along with audio data associated with the plurality of highlighted objects. In some embodiments, the set of input images may be received for tracking. Additionally, in some embodiments, the tracking may be performed while traversing from one highlighted object to another. It should be noted that a narrator tool (analogous to the narrator module 206) may be used to traverse from one highlighted object to another. Further, each of the set of images may correspond to a web page or an application window.

At step 304, each of the plurality of highlighted objects may be cropped from each of the set of images. It should be noted that the cropping may be executed based on tracking of the plurality of highlighted objects. In some embodiments, a bounding box enclosing an object may be created. It should be noted that the bounding box is created when the object is highlighted while traversing from one highlighted object to another. Additionally, in some embodiments the object enclosed within the bounding box may be cropped.

At step 306, an audio clip associated with each of the plurality of highlighted objects may be captured from the audio data. It may be noted that capturing of the audio clip may be performed based on tracking. In some embodiments, a portion of the audio data may be recorded when an object is highlighted, while traversing from one highlighted object to another. The recorded portion of the audio data may correspond to the audio clip. Additionally, in some embodiments, the audio clip may be associated with the object that may be highlighted.

At step 308, each of the plurality of highlighted objects may be labelled. The each of the plurality of highlighted objects may be labelled based on a text data to generate a labelled reference image. It should be noted that the text data is generated from the audio clip associated with each of the plurality of highlighted objects. An audio to text convertor may be used to generate the text data from the audio clip. Additionally, in some embodiments, a plurality of keywords may be extracted from the generated text data. Each of the plurality of highlighted objects may be labelled with at least one of the plurality of keywords to get labelled reference images.

Thereafter, an XML file corresponding to a labelled reference image may be generated, in some embodiments of the process 300. It should be noted that the XML file may be associated with an object. Also, it should be noted that the XML file may include a label of the object, a reference coordinate of the object, a height of the object, and a width of the object. Further, in some embodiments, an AI model (analogous to the AI model 218) may be trained using a plurality of labelled reference images as training dataset. Here, the AI model may be trained for an object recognition application.

Figure 4:
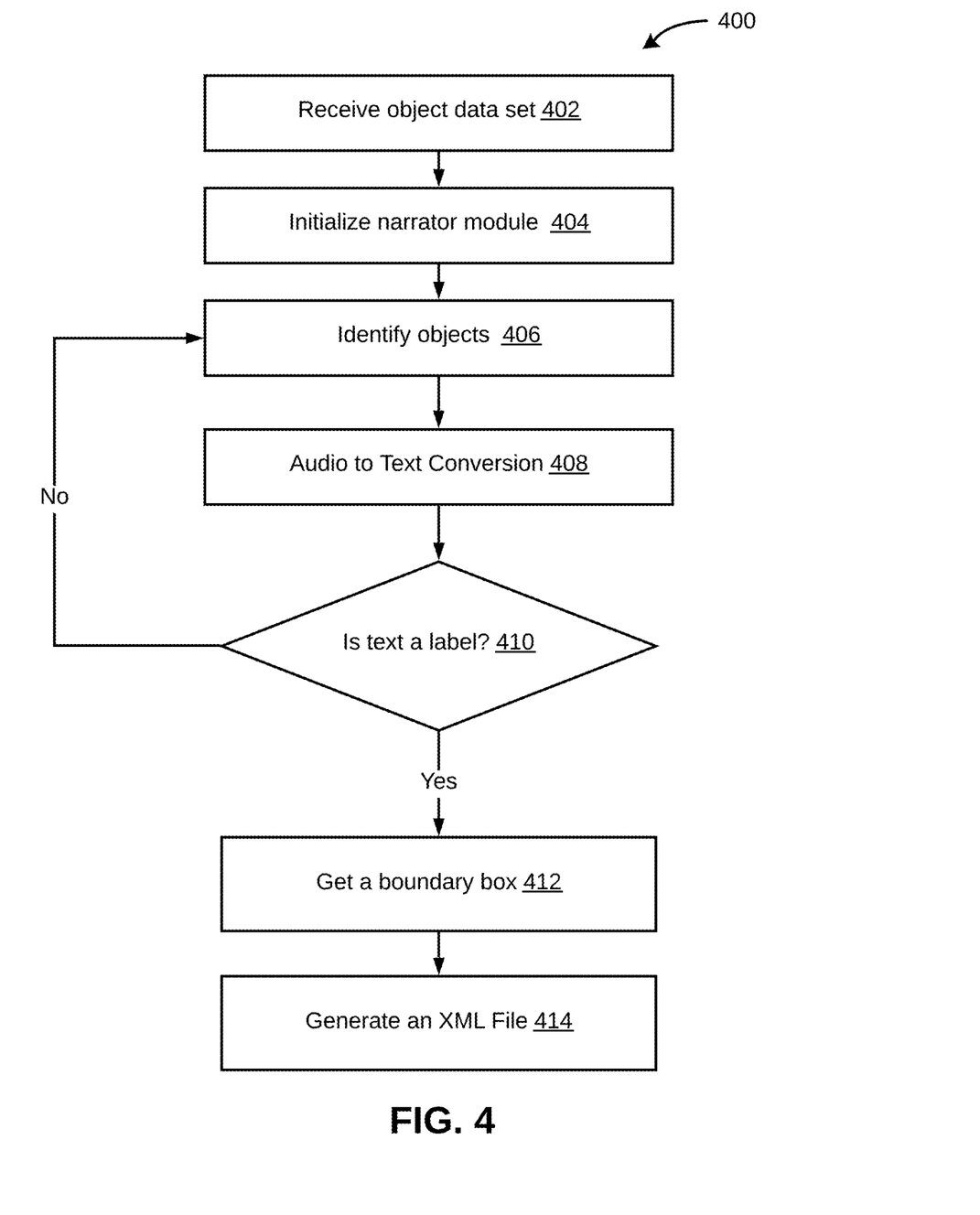
FIG. 4 is a flow diagram of a detailed exemplary process for generating and labelling reference images, in accordance with some embodiments of the present disclosure.

Referring now to FIG. 4, an exemplary process for generating and labelling reference images is depicted in greater detail via a flowchart, in accordance with some embodiments of the present disclosure. All the steps 402-414 may be performed by the modules 206-216 of the image generation and labelling device 102. At step 402, object data set may be received. The object data set may correspond to the plurality of input images and audio. Thereafter, at step 404, the narrator module 206 depicted in FIG. 2, may be initialized. The narrator module 206 may highlight and track the highlighted objects in the input images, while traversing from one object to another. Also, an audio clip associated with each of the highlighted objects may be captured while traversing from one object to another. In some embodiments, the image with highlighted objects may be compared to the initial input image in order to identify the coordinates corresponding the highlighted objects for cropping.

At step 406, the highlighted objects may be identified in the input images for cropping. In some embodiments, an image processing technique may be employed to crop the highlighted objects from the input images. Additionally, in some embodiments a pixel to pixel comparison may be performed between the image with highlighted objects and corresponding initial input image in order to identify the dimensions (say, height, width, and (x, y) co-ordinates) associated with the highlighted objects for cropping. At step 408, captured audio clips may be converted into text data using any audio to text conversion technique. The text data may be further used to label the cropped images. In some embodiments, the objects within the input images may be mapped with the audio.

At step 410, a condition, whether the text data generated from the audio is a label or not, may be checked. In case the text data comprises a label, the next step may be executed. Otherwise, the process 400 may start from the step 406, for example, identification of object may be performed again. In some embodiments, correct labels to respective cropped objects may be tagged. At step 412, a boundary box may be formed intending to generate the XML file corresponding the labelled reference images by considering a label of the object, a reference coordinate of the object, a height of the object, and a width of the object. Further, at step 414, an XML file corresponding to the object may be generated that may be used as reference images to train the AI model 218.

Thus, the present disclosure may help to automate the process of reference image generation and labelling. The disclosed method and system may solve the problem when there is a requirement to crop and label a large amount of data for training Machine Learning (ML) models. Additionally, the disclosure delivers some advantages like reduction in manual errors, effortless image cropping and labelling, and less time consumption. The disclosure provides complete automation with no footprints. Also, the reduction in manual intervention almost to zero may be observed. The method and system described in the present disclosure enables a user to crop and label the objects in the image and subsequently to generate XML file automatically, with less efforts.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims.

Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method of generating and labelling reference images, the method comprising:
   tracking, by an image generation and labelling device, a plurality of highlighted objects in a set of input images along with audio data associated with the plurality of highlighted objects;
   cropping, by the image generation and labelling device, each of the plurality of highlighted objects from each of the set of images based on tracking;
   contemporaneously capturing, by the image generation and labelling device, an audio clip associated with each of the plurality of highlighted objects from the audio data based on tracking, wherein contemporaneously capturing comprises:
      recording a portion of the audio data when an object is highlighted, while traversing from one highlighted object to another, as the audio clip; and
      associating the audio clip with the object that is highlighted;
   labelling, by the image generation and labelling device, each of the plurality of highlighted objects based on a text data generated from the audio clip associated with each of the plurality of objects to generate a labelled reference image; and
   generating, by the image generation and labelling device, an Extensible Markup Language (XML) file corresponding to the labelled reference image.

2. The method of claim 1, wherein tracking comprises:
   receiving the set of input images; and
   tracking the plurality of highlighted objects and audio data associated with the plurality of highlighted objects, while traversing from one highlighted object to another, using a narrator tool.

3. The method of claim 1, wherein each of the set of images correspond to a web page or an application window, and wherein the labelled referenced image is employed for automating at least one of application testing and device testing.

4. The method of claim 1, wherein cropping comprises:
   creating a bounding box enclosing an object when the object is highlighted while traversing from one highlighted object to another; and
   cropping the object enclosed within the bounding box.

5. The method of claim 1, wherein labelling comprises:
   generating the text data from an audio clip associated with an object using audio-to-text convertor;
   extracting a plurality of keywords from the text data; and
   labelling the object with at least one of the plurality of keywords.

6. The method of claim 1, wherein the XML file is associated with an object and comprises a label of the object, a reference coordinate of the object, a height of the object, and a width of the object.

7. The method of claim 6, further comprising training an AI model using a plurality of XML files as training dataset, wherein the AI model is trained for an object recognition application.

8. A system for generating and labelling reference images, the system comprising:
   a processor; and
   a memory communicatively coupled to the processor, wherein the memory stores processor-executable instructions, which, on execution, causes the processor to:
      track a plurality of highlighted objects in a set of input images along with audio data associated with the plurality of highlighted objects;
      crop each of the plurality of highlighted objects from each of the set of images based on tracking;
      contemporaneously capture audio clip associated with each of the plurality of highlighted objects from the audio data based on tracking, wherein contemporaneously capturing comprises:
         recording a portion of the audio data when an object is highlighted, while traversing from one highlighted object to another, as the audio clip; and
         associating the audio clip with the object that is highlighted;
      label each of the plurality of highlighted objects based on a text data generated from the audio clip associated with each of the plurality of objects to generate a labelled reference image; and
      generate an Extensible Markup Language (XML) file corresponding to the labelled reference image.

9. The system of claim 8, wherein the processor tracks the plurality of highlighted objects by:
   receiving the set of input images; and
   tracking the plurality of highlighted objects and audio data associated with the plurality of highlighted objects, while traversing from one highlighted object to another, using a narrator tool.

10. The system of claim 8, wherein each of the set of images correspond to a web page or an application window, and wherein the labelled referenced image is employed for automating at least one of application testing and device testing.

11. The system of claim 8, wherein the processor crops each of the plurality of highlighted objects by:
   creating a bounding box enclosing an object when the object is highlighted while traversing from one highlighted object to another; and
   cropping the object enclosed within the bounding box.

12. The system of claim 8, wherein the processor labels each of the plurality of highlighted objects by:
   generating the text data from an audio clip associated with an object using audio-to-text convertor;
   extracting a plurality of keywords from the text data; and
   labelling the object with at least one of the plurality of keywords.

13. The system of claim 8, wherein the XML file is associated with an object and comprises a label of the object, a reference coordinate of the object, a height of the object, and a width of the object.

14. The system of claim 13, wherein the processor-executable instructions further cause the processor to train an AI model using a plurality of XML files as training dataset, wherein the AI model is trained for an object recognition application.

15. A non-transitory computer-readable medium storing computer-executable instructions for:
- tracking a plurality of highlighted objects in a set of input images along with audio data associated with the plurality of highlighted objects;
- cropping each of the plurality of highlighted objects from each of the set of images based on tracking;
- contemporaneously capturing an audio clip associated with each of the plurality of highlighted objects from the audio data based on tracking, wherein contemporaneously capturing comprises:
  - recording a portion of the audio data when an object is highlighted, while traversing from one highlighted object to another, as the audio clip; and
  - associating the audio clip with the object that is highlighted;
- labelling each of the plurality of highlighted objects based on a text data generated from the audio clip associated with each of the plurality of objects to generate a labelled reference image; and
- generating an Extensible Markup Language (XML) file corresponding to the labelled reference image.

16. The non-transitory computer-readable medium of claim 15, wherein tracking comprises:
- receiving the set of input images; and
- tracking the plurality of highlighted objects and audio data associated with the plurality of highlighted objects, while traversing from one highlighted object to another, using a narrator tool.

17. The non-transitory computer-readable medium of claim 15, wherein labelling comprises:
- generating the text data from an audio clip associated with an object using audio-to-text convertor;
- extracting a plurality of keywords from the text data; and
- labelling the object with at least one of the plurality of keywords.

* * * * *